United States Patent
Kurauchi et al.

Patent Number: 5,691,047
Date of Patent: Nov. 25, 1997

[54] POROUS MULTI-LAYER FILM

[75] Inventors: Hiroshi Kurauchi; Tetuo Akazawa; Akira Kawabata, all of Osaka, Japan

[73] Assignee: Ube Industries, Ltd., Yamaguchi, Japan

[21] Appl. No.: 440,075

[22] Filed: May 12, 1995

[30] Foreign Application Priority Data

May 12, 1994 [JP] Japan .................. 6-098394
May 12, 1994 [JP] Japan .................. 6-098395

[51] Int. Cl.$^6$ .............. B32B 3/26; B32B 27/32; H01M 2/16
[52] U.S. Cl. .............. 428/315.7; 428/315.9; 428/316.6; 428/517; 429/145
[58] Field of Search .............. 429/144, 145; 428/316.6, 319.9, 516, 517, 315.7, 315.9

[56] References Cited

U.S. PATENT DOCUMENTS

| | | | |
|---|---|---|---|
| 3,578,544 | 5/1971 | Thorsrud | 428/316.6 X |
| 4,731,304 | 3/1988 | Lundquist et al. | 429/62 |
| 4,863,792 | 9/1989 | Mrozinski | 428/315.5 |
| 5,342,708 | 8/1994 | Green et al. | 429/145 |

FOREIGN PATENT DOCUMENTS

| | | |
|---|---|---|
| 4181651 | 6/1992 | Japan . |
| 6556293 | 3/1994 | Japan . |

*Primary Examiner*—Marion E. McCamish
*Assistant Examiner*—Blaine R. Copenheaver
*Attorney, Agent, or Firm*—McAulay Fisher Nissen Goldberg & Kiel, LLP

[57] ABSTRACT

A porous multi-layer film favorably employable as a separator film for a nonaqueous electric battery comprises at least three united polyolefin layers, in which at least one polyolefin layer is a polyethylene layer and at least one polyolefin layer is a polypropylene layer which is placed in contact with the polyethylene layer. The polyolefin layers are combined to form a united structure with a peel strength of at least 3 g/15 mm and has a pore volume of 30–80%, a maximum pore size of 0.02–2 μm, a shutdown temperature of 135°–140° C., and a thermal durability to maintain the shutdown condition up to at least 180° C.

18 Claims, 4 Drawing Sheets

POROUS MULTI-LAYER FILM

FIELD OF THE INVENTION

The present invention relates to a porous multi-layer film having uniform micropores. In particular, the invention relates to a porous multi-layer film which is favorably employable as a battery separator to be incorporated in batteries such as a lithium battery.

BACKGROUND OF THE INVENTION

Porous plastic films are employable in various fields of art. For instance, a porous plastic film is employed as a battery separator in nonaqueous batteries such as a lithium battery (i.e., lithium cell), a separator in electrolytic condensers, an insulator in electronic devices, an artificial lung diaphragm, a plasma purifier, a respiratory clinical clothing, a filter for separating microorganisms and virus from water, a separator for gaseous mixtures, or a filter in air-conditioner.

Heretofore, most of porous plastic films comprise a single ply porous film. The single ply porous film is easily prepared, but is not satisfactory in its characteristics in certain fields. For instance, it is now understood that a singly ply porous film cannot satisfy the enhanced requirements for battery separators of nonaqueous batteries, especially, a lithium battery.

In a battery such as a nonaqueous battery, a separator is placed to obviate production of short circuit between a positive electrode and a negative electrode. As the nonaqueous battery, a lithium battery (i.e., lithium secondary cell) has been paid specific attention and studied widely. The lithium battery comprises a negative electrode of metallic lithium, an alloy of lithium and other metal, an organic material such as carbon or graphite which is adsorbable of lithium ion or storable of lithium ion by intercalation, an electro conductive polymer doped with lithium ion, or the like; a positive electrode of a fluorinated graphite represented by $(CF_x)_n$, a metal oxide such as $MnO_2$, $V_2O_5$, CuO, $Ag_2CrO_4$ or $TiO_2$, a sulfide, or a chloride; and a nonaqueous electrolyte solution comprising an electrolyte such as $LiPF_6$, $LiBF_4$, $LiClO_4$ or $LiCF_3SO_3$ in an organic solvent such as ethylene carbonate, propylene carbonate, γ-butyrolactone, acetonitrile, 1,2-dimethoxyethane or tetrahydrofuran.

It is known that lithium is very reactive. Accordingly, if an abnormal electric current flows in the lithium battery due to production of external short circuit or erroneous connection, the temperature of the battery extremely increases and causes thermal damage in a device equipped with that lithium battery. In order to obviate such troubles, a battery separator (also called simply "separator") is placed between the positive and negative electrodes. Examples of the known separators are as follows:

1) Porous single ply (i.e., mono-ply) film of thermoplastic resin such as polyethylene or polypropylene, as disclosed in GB 1180066, U.S. Pat. Nos. 3,679,538, 4,190,707, 5,173,235, Japanese Patent Publications No. 46-40119, No. 55-32531, and No. 59-37292, and Japanese Patent Provisional Publications No. 60-23954 and No. H2-75151;

2) Porous film of a mixture of polyethylenes having different molecular weight or a mixture of polyethylene and polypropylene, as disclosed in EP-A-565938, and Japanese Patent Provisional Publications No. H2-21559, No. H2-334309, and No. M5-331306;

3) Porous film having a support of thermoplastic resin or non-woven fabric, as disclosed in EP-A-336170, and Japanese Patent Provisional Publications No. H3-245457 and No. H1-258358;

4) Laminated multi-layer porous film composed of plural porous films of different material, as disclosed in U.S. Pat. No. 4,650,730, and Japanese Patent Provisional Publications No. 62-10857, No. 62-53813, No. 63-308866, and No. H6-20671; and 5) Laminated multi-layer porous film made by combining two porous films via adhesive or by application of heat and pressure.

The porous battery separator film functions primarily to separate one electrode from another electrode for obviating the production of short circuit between them under the condition that the electric voltage is kept at the predetermined level. The porous separator film also functions to terminate flow of ion between both electrodes by closing its pores when the inner temperature of the battery elevates beyond the predetermined safety temperature level due to production of abnormal electric current, so that serious troubles owing to the abnormally elevated temperature such as occurrence of fire can be prevented. The obviation of troubles caused by the abnormally elevated temperature is a very important function for the separator of batteries. The function of the porous separator film to close its pores is generally called "pore closing" or "shutdown (SD)". The shutdown (SD) is confirmed by a gas permeability (which is also referred to as "gas permeation rate") of the tested porous film to reach 6,000 in terms of Gurley Number (defined in ASTM D-726).

A battery separator film for lithium battery should have an appropriate shutdown temperature range such as the range of 110° to 160° C., preferably 120° to 150° C. If the shutdown temperature is too low, the ionic flow is disturbed when a minor temperature increase takes place. A battery which shows such behavior is not practically acceptable. If the shutdown temperature is too high, the lithium battery may cause fire or other serious troubles.

The separator film for lithium battery further is ought to have a thermal durability to maintain the shutdown condition up to a certain temperature. In more detail, even if the separator closes its pores to shut down the current of the battery, the temperature may further elevate to a certain extent after the shutdown. If the separator film has insufficient thermal durability to such heat elevation, the film may be easily melted and broken down in part when the inner temperature of the battery further elevates beyond the shutdown temperature. If the separator is broken down, the ionic flow again starts and additional temperature elevation cannot be prevented. Accordingly, the separator should have enough thermal durability to keep the shutdown condition up to a temperature as high as possible.

As battery separator film should further have low electric resistance, high mechanical strength such as high elastic recovery, little variation of film thickness, and little variation of the electric resistance, in addition to the above-mentioned appropriate shutdown characteristics.

As battery separator films, there have been proposed a great number of materials, as described hereinbefore. However, according to studies of the present inventors, more improvement is required. In more detail, the single ply porous polypropylene film has a shutdown temperature of 170° C. or higher, which is disadvantageously close to the melting point of lithium, while the single ply porous polyethylene film has an appropriate shutdown temperature of approximately 135° C. However, the single ply porous polyethylene film has poor thermal durability such as a low melting temperature of approximately 145° C. Moreover, the single ply porous polyethylene film has poor elastic recovery to result in excessive stretching of the film in its incorporation into a battery. Therefore, its productivity and workability are low. Thus, the single ply porous films of thermoplastic resins require improvement, particularly in their safety reliability.

The known single ply porous film of a mixture of polyethylenes having different molecular weight has a thermal durability up to approximately 150° C. and an elastic recovery of approximately 3,400 kg/cm$^2$, which are only slightly improved, as compared to the above-mentioned single ply porous polyethylene film. The known single ply porous film of a mixture of polyethylene and polypropylene having a sea-island structure shows a thermal stability up to approximately 180° C. and an elastic recovery of approximately 4,200–6,400 kg/cm$^2$, which are further improved in its shutdown and mechanical characteristics, as compared to the above-mentioned single ply porous polyethylene mixture film. Nevertheless, the improvement is still not satisfactory. Moreover, there is another disadvantage in that the porous film formed by stretching the film of the sea-island structure is apt to vary in its product quality, and reproducibility is low.

The porous film on a support of non-woven fabric or the like which is also known has a disadvantage in its safety which is caused by its support material. Also disadvantageous is that insufficient thermal durability is seen as is in the case using a single ply porous polyethylene or polypropylene film.

The known laminated multi-layer porous film comprising a plurality of porous films of different thermoplastic resin has been developed to solve the problems observed in the use of the singly ply thermoplastic film and is prepared by the steps of stretching independently plural films of different thermoplastic resins to form a porous structure in their bodies, combining the produced porous films together using an adhesive or under pressure. Theoretically, thus produced multi-layer porous film should have sufficient characteristics required for the use as a battery separator. However, it is not easy to produce in the actual production line a porous laminated film having satisfactory characteristics. For instance, it is not easy to combine appropriately the porous films to each other under pressure or even using an adhesive. If the porous films are heated for firmly combining them under pressure, not a small portion of the pores are closed. Further, the pores in one film sometimes does not well communicate with the pores in another film laminated thereon, and the expected continuous porous structure is scarcely formed. Thus prepared porous laminated films having poor continuous porous structure produce unfavorable high electric resistance in the battery. Application of a low pressure, a small amount of an adhesive, or a low thermal energy to the laminated porous films to obviate the closure of pores gives a laminated film having poor resistance to film separation. In other words, the component film plies of the laminated porous film showing poor resistance to film separation are easily separated from each other when the laminated film is introduced into a battery. Further deformation of the laminated film such as curling, shrinkage, or elongation sometimes takes place in the procedure of introducing the laminated film into a battery.

SUMMARY OF THE INVENTION

Accordingly, the present invention has an object to provide an improved porous multi-layer film of thermoplastic resin.

Particularly, the invention has an object to provide an improved porous multi-layer film having uniform micropores, an appropriate shutdown temperature, a high thermal durability, a property to keep the shutdown condition for a wide temperature range, a high resistance to film separation, and a high elastic recovery.

Specifically, the invention has an object to provide an improved porous multi-layer film which is favorably employable as a battery separator to be installed into non-aqueous batteries such as a lithium battery.

The present invention resides in a porous multilayer film comprising at least three united polyolefin layers, at least one polyolefin layer being a polyethylene layer and at least one polyolefin layer being a polypropylene layer which is placed in contact with the polyethylene layer, said three united polyolefin layers being combined to form a united structure with a peel strength of at least 3 g/15 mm, which has a pore volume in the range of 30 to 80%, a maximum pore size in the range of 0.02 to 2 μm, a shutdown temperature in the range of 135° to 140° C., and a durability to maintain the shutdown condition up to at least 180° C.

The porous multi-layer film of the invention preferably comprises three polyolefin layers in that two polypropylene layers are combined via an intervening polyethylene layer.

The porous multi-layer film of the invention preferably has a gas permeability in the range of 150 to 1,500 in terms of Gurley Number.

The porous multi-layer film of the invention is preferably prepared by stretching a laminate of polyolefin layers which comprises at least one polyethylene layer and at least one polypropylene layer being placed in contact with the polyethylene layer, and has a united structure with a peel strength of at least 3 g/15 mm.

The porous multi-layer film of the invention preferably contains no fillers.

The porous multi-layer film of the invention can be prepared by a process comprising the steps of:

combining at least three polyolefin films which comprise at least one polyethylene film and at least one polypropylene film being placed in contact with the polyethylene film under pressure at a temperature of 120° to 140° C. to form a united film structure;

heating the united film structure to a temperature of 110° to 140° C.;

stretching the heated film structure at a temperature of −20° C. to +50° C. by 5 to 200%;

stretching further the once stretched film structure at a temperature of 70° to 130° C. by 100 to 400%; and heating the last stretched film structure at a temperature higher than the last stretching temperature by 5° to 45° C.

Specifically, the porous three ply film of the invention can be preferably prepared by a process comprising the steps of:

combining two polypropylene films via one polyethylene film under pressure at a temperature of 120° to 140° C. to form a united film structure;

heating the united film structure to a temperature of 110°0 to 140° C.;

stretching the heated film structure at a temperature of −20° C. to +50° C. by 5 to 200%;

stretching further the stretched film structure at a temperature of 70° to 130° C. by 100 to 400%; and heating the last stretched film structure at a temperature higher than the last stretching temperature by 5° to 45° C.

In the above-mentioned process, the first stretching step is preferably performed at 20° to 35° C.

DETAILED DESCRIPTION OF THE INVENTION

The present invention resides in an improvement of a porous multi-layer film comprising plural polyolefin layers. The porous structure of the multi-layer film of the invention can be formed by stretching a united polyolefin layers under specific conditions. In the united polyolefin layers of the multi-layer film of the invention, at least one polyolefin layer is a polyethylene layer and at least one polyolefin layer is a polypropylene layer. The polyethylene layer and the polypropylene layer are placed in contact with each other. The united polyolefin layers comprise three or more (e.g., four, five, and so on) polyolefin layers. Preferably, the united polyolefin layers comprise two polypropylene layers and one intervening polyethylene layer. When two or more polypropylene layers are incorporated into the united structure, each polypropylene layer can have different molecular weight and different characteristics. When two or more polyethylene layers are incorporated into the united structure, each polyethylene layer also can have different molecular weight and different characteristics.

The polypropylene which forms the polypropylene layer preferably has a high stereo regularity. The polyethylene preferably is a high-density polyethylene, but an intermediate density polyethylene also can be employed. The polypropylene and polyethylene preferably are homopolymers, but copolymers can be employable. The polypropylene and polyethylene can contain surfactants, antioxidants, plasticizers, flame retardants, colorants, and other additives. However, the polypropylene and polyethylene preferably contain no fillers.

The united polyolefin layers can be prepared favorably by combining beforehand prepared three or more polyolefin films by heating them under pressure. Otherwise, united three or more polyolefin films can be prepared by co-extrusion. The polyolefin film can be preferably prepared by melt extrusion using a T-die. An inflation method and a wet extrusion method also are employable.

Each polyolefin film can be prepared by a melt extrusion method using a T-die at a temperature higher than the melting temperature of the employed polyolefin by 20° to 60° C., and at a draft ratio of 10 to 1,000, preferably 200 to 500. The haul-off speed generally ranges from 10 to 50 m/min., but this range is not limitative.

It has been confirmed that the characteristics of the resulting porous multi-layer film, such as pore sizes, pore volume (or porosity), resistance to separation of the polyolefin layers, and mechanical strength, are greatly influenced by the birefringence and elastic recovery of the extruded films. The polypropylene film to be combined and stretched preferably has a birefringence of $10 \times 10^{-3}$ to $20 \times 10^{-3}$ (more preferably $11 \times 10^{-3}$ to $14 \times 10^{-3}$) and preferably shows an elastic recovery of 80 to 94% (more preferably 84 to 92%) at 100% elongation of the film after heat treatment at 150° C. for 60 minutes. The polyethylene film to be combined and stretched preferably has a birefringence of $20 \times 10^{-3}$ to $40 \times 10^{-3}$ (more preferably $25 \times 10^{-3}$ to $35 \times 10^{-3}$) and preferably shows an elastic recovery of 20 to 50% (more preferably 25 to 40%) at 50% elongation of the film.

The birefringence of the polyolefin film can be measured under a crossed nicols using a polarizing microscope and a Berek compensator. The elastic recovery is obtained by the following formula (1) or (2). Formula (1) is for a polypropylene film, and formula (2) is for a polyethylene film.

In the determination of the elastic recovery, a strip of 10 mm×50 mm of a polypropylene film is heat-treated at 150° C. for 60 min., and mounted to a tensile strength tester at 25° C., 65% RH, for elongating the strip at a drawing rate of 50 mm/min., to give 100% elongation, and just after the 100% elongation relaxing the elongated strip at the same rate. As for the polyethylene film, a strip of 15 mm×50 mm (2 inches) with no heat-treatment is mounted to a tensile strength tester at 25° C., 65% RH, for elongating (or drawing) the strip at a drawing rate of 50 mm/min., to give 50% elongation, keeping the 50% elongated film for 1 minute, and subsequently relaxing the elongated strip at the same rate.

Formula (1)

Elastic recovery(%)=[(length at 100% elongation )−(length of fully relaxed film after 100% elongation)]/[length of film before elongation]

Formula (2)

Elastic recovery(%)=[(length at 50% elongation)−(length of fully relaxed film after 50% elongation)]/[(length of 50% stretched film)−(length of film before elongation)]

Each of the polypropylene film and polyethylene film preferably has a thickness in the range of 5 to 20 μm, more preferably 10 to 15 μm. An appropriate thickness can be chosen from the viewpoints of the desired thickness of the porous multi-layer film obtained by the stretching procedure and the desired use of the porous film.

The polypropylene film(s) and polyethylene film(s) can be preferably united by pressing laminated films with heating. It is preferred that the laminated films comprise two polypropylene films and one intervening polyethylene film. The resulting porous multi-layer film of the two polypropylene layers and one intervening polyethylene layer favorably shows little curling, high resistance to external damage, high thermal durability, and high mechanical strength. Accordingly, the porous multilayer film of the two polypropylene layers and one intervening polyethylene layer is advantageously employable as a battery separator which requires specific characteristics such as high safety and high reliability.

For simplifying the description of the process for preparing the porous multi-layer film of the invention, the following description is mainly addressed to the preferred three layer structure of polypropylene layer-polyethylene layer-polypropylene layer.

The polypropylene films and polyethylene film are wound out from respective raw film feed rolls and are passed together through a pair of heated nip rolls under pressure to give a united film. The application of pressure under heating is adopted for combining the polypropylene and polyethylene films to give a united film structure with little lowering of birefringence and elastic recovery. The nip rolls are preferably heated to 120°–140° C., more preferably to 125°–135° C. The temperature of the nip rolls means a temperature for heating the passing films. If the heating temperature is too low, the polypropylene layers in the united film are easily separated when the united film is subjected to the following stretching procedure. If the heating temperature is too high, the polyethylene film melts to decrease the birefringence and elastic recovery. Therefore, the resulting porous multi-layer film may not have the desired characteristics. The pressure applied by the nip rolls preferably is in the range of 1 to 3 kg/cm² (linear pressure), and the wind-out speed preferably is in the range of 0.5 to 8 m/min.

The united film produced by the application of heat and pressure to the polypropylene-polyethylene-polypropylene layers preferably has a resistance to separation (i.e., peel strength) of not less than 3 g/15 mm, generally in the range of 3 to 60 g/15 mm, and a thickness of 20 to 60 μm.

The united film is heat-treated prior to stretching. The heat treatment can be done at a constant length or under application of 3 to 10% tension using an oven with circulating heated air or a heat roll, generally at a temperature of 110° to 140° C., preferably at a temperature of 115° to 130° C. The united film heated only to a low temperature shall not have satisfactory pores after the following stretching procedure. The heat treatment at an extremely high temperature causes melting of the polyethylene layer. The heat treatment is generally conducted for 3 sec. to 3 min.

The united film is stretched to give a porous structure after the above-mentioned heat treatment. The stretching procedure is preferably conducted twice, that is, a first low temperature stretching and a second high temperature stretching. Only a single stretching procedure may give unsatisfactory porous structure or poor resistance to layer separation.

The low temperature stretching is performed utilizing difference of circumferential velocity between a series of draft rolls.

The low temperature stretching is performed preferably at −20° C. to +50° C., more preferably 20° to 30° C. If the temperature is too low, the film under stretching may be broken, and if the temperature is too high, enough pore volume may not be obtained. The draw ratio for the low temperature stretching preferably is in the range of 5 to 200%, more preferably in the range of 10 to 100%. If the draft ratio is too low, the desired pore volume may not be obtained. If the draft ratio is too high, the desired pore volume as well as the desired pore size may not be obtained.

The draft ratio of the low temperature stretching ($E_1$) is defined in the following formula (3) wherein $L_1$ means the length of the film after the low temperature stretching and $L_0$ means the length of the film before the low temperature stretching.
Formula (3)

$$E_1=[(L_1-L_0)/L_0]\times 100$$

The film having been subjected to the low temperature stretching is subsequently stretched at a high temperature. The high temperature stretching is generally conducted in an oven with circulating heated air utilizing difference of circumferential velocity between a series of draft rolls. There is no specific limitation with respect to numbers of the draft rolls for the use in the high temperature stretching. Generally, 7 to 14 sets of the draft rolls are employed.

The high temperature stretching is performed preferably at 70° C. to 130° C., more preferably 80° to 125° C. If the stretching temperature is outside the above range, enough pore volume may not be obtained. The high temperature stretching is preferably conducted at a temperature higher than the that of the low temperature stretching by 40° to 100° C. The draw ratio preferably is in the range of 100 to 400%. If the draft ratio is too low, the gas permeability rate of the resulting film may become too low. If the draft ratio is too high, the gas permeability rate may become too high. Accordingly, the above-mentioned range is preferred.

The draft ratio of the high temperature stretching ($E_2$) is defined in the following formula (4) wherein $L_2$ means the length of the film after the high temperature stretching and $L_1$ means the length of the film after the low temperature stretching.
Formula (4)

$$E_2=[(L_2-L_1)/L_1]\times 100$$

The film having been subjected to the low temperature stretching and the subsequent high temperature stretching is then heat-treated at a temperature higher than the temperature of the high temperature stretching by to 45° C.

The heat-treatment can be conducted, for instance, by heat-shrinking of the stretched filmy 10 to 50% so as to prevent the shrinkage caused by the residual stress in the stretched film or by thermosetting which comprises heating the stretched film under defining the heated film to keep the film length constant. The heat-treatment is conducted to give the desired porous multi-layer film having a high dimensional stability in addition to the desired resistance to the layer separation.

The porous multi-layer film of the invention can have a pore volume in the range of 30 to 50%, preferably 35 to 60%, and a maximum pore size of 0.02 to 2 μm, preferably 0.08 to 0.5 μm. The pore volume and maximum pore size maybe influenced by the selection of the conditions of the preparing process. If the pore volume is too small, the obtained film is not appropriate for the use as a battery separator. If the pore volume is too large, the film shows poor mechanical strength. If the maximum pore size is too small, the obtained film is not appropriate for the use as a battery separator or a condenser separator because enough ionic movement is not accomplished. Such small pore size is still not appropriate for the use as a filter in clinical treatment, water purifier, air conditioning, etc., because filtration pressure becomes too high. If the maximum pore size is too large, excessively large ionic movement takes place in the use as a battery separator or a condenser separator. In the use as a filter in a water-treatment apparatus, the expected enough removal of microorganisms or virus cannot be attained. The porous film having too large pores is also inappropriate for the use as a filter for purifying blood plasma in the clinical treatment.

The porous multi-layer film of the invention preferably has a gas permeability in the range of 150 to 1,500 (more preferably 300 to 800) in terms of Gurley Number. In the use as a battery separator, too low gas permeability results in undesirable low ion flow. Too high gas permeability results in excessively large ion flow, which may cause extremely high temperature increase when troubles happen in the battery.

Figure 6:
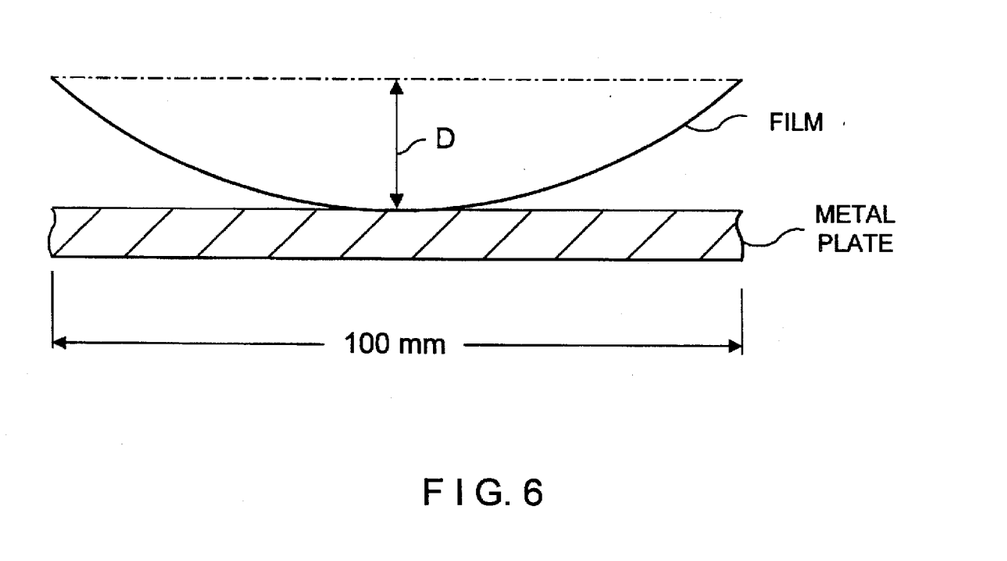
FIG. 6 schematically shows the measurement of the curling height.

The porous multi-layer film of the invention preferably has a united structure with a peel strength of at least 3 g/15 mm, generally 3 to 60 μg/15 mm. The porous multi-layer film of the invention preferably has a curling height of less than 5 mm, more preferably less than 3 mm, most preferably less than 2 mm. The curling height is measured by placing a strip of 20 mm×100 mm of the film on a metal plate and measuring an average of heights of both ends along the longitudinal side, as is illustrated in FIG. 6. If the peel strength is too low, the constitutional films of the porous multi-layer film may peel off, for instance, in the incorporation of the porous multi-layer separator film into a battery. An excessively low peel strength may cause large curling tendency and undesirable film stretching.

An appropriate thickness of the porous multi-layer film of the invention can be determined depending upon the desired use of the film. Therefore, there is no specific limitation with respect to the thickness of the porous multi-layer film of the invention. Generally, the thickness for the battery separator film is in the range of 20 to 50 µm, from the viewpoints of mechanical strength, performance, and requirement to minimize the battery.

The invention is further described by the following non-limitative examples.

EXAMPLE 1

Polypropylene (number average molecular weight: 70,000, weight average molecular weight: 480,000, melt index: 3, Ube Polypro F103EA, available from Ube Industries Ltd.) was melt-extruded at 200° C. using a T-die (discharge width: 1,000 mm, discharge lip opening: 4 mm). The discharged film was sent to a cooling roll kept to 90° C. and cooled by applying a cooled air (25° C.). The cooled film was then collected at a rate of 32 m/min. and a draft ratio of 366. The obtained polypropylene film (unstretched) had a thickness of 12 µm, a birefringence of $14.7 \times 10^{-3}$, and an elastic recovery of 88.2% at 100% elongation of the film after heat treatment at 150° C. for 60 minutes.

Independently, high density polyethylene (density: 0.968 g/cm$^2$, melt index: 5.5, Hizex 2208J, available from Mitsui Petrochemical Co., Ltd.) was melt-extruded at 173° C. using a T-die (discharge width: 1,000 mm, discharge lip opening: 4 mm). The discharged film was sent to a cooling roll kept to 115° C. and cooled b y applying a cooled air (25° C.). The cooled film was then collected at a rate of 40 m/min. and a draft ratio of 448. The obtained polyethylene film (unstretched) had a thickness of 11 µm, a birefringence of $27.1 \times 10^{-3}$, and an elastic recovery of 29.6% at 50% elongation of the film.

A laminated three layer film comprising two polypropylene layers and one intervening polyethylene layer was prepared in the following manner using the above obtained unstretched polypropylene film and unstretched polyethylene film.

Two sheets of the unstretched polypropylene films and one sheet of the unstretched polyethylene film were wound out from respective feed roll stands at a rate of 5.4 m/min. The unstretched films were passed through heating nip rolls to combine the films at 125° C. and 1.8 kg/cm(linear pressure), and then collected by a cooling roll (cooled to 50° C.) at the same rate. The tensions applied for winding out the unstretched films were 3 kg for the polypropylene films and 0.9 kg for the polyethylene film. The resulting laminated film had a thickness of 34 µm and a peeling strength of 16 g/15 mm.

The laminated three layer film was passed through an oven with circulating heated air (heated to 125° C.) for a period of 113 seconds at 5% stretching. The heat-treated film was then stretched by means of a set of nip rolls kept to 35° C. to produce 20% stretching. The distance between the nip rolls was 350 mm, and the feed roll gave a feeding rate of 1.6 m/min. The film was subsequently supplied into an oven with circulating heated air (heated to 110° C.) for stretching the heated film to give total 115% stretching utilizing difference of circumferential rate of the employed rolls. The twice stretched film was then heat-fixed on a heated roll at 125° C. for 25 seconds to attain 16.7% relaxation. In this manner, a continuous porous multi-layer film was obtained.

Figure 1:
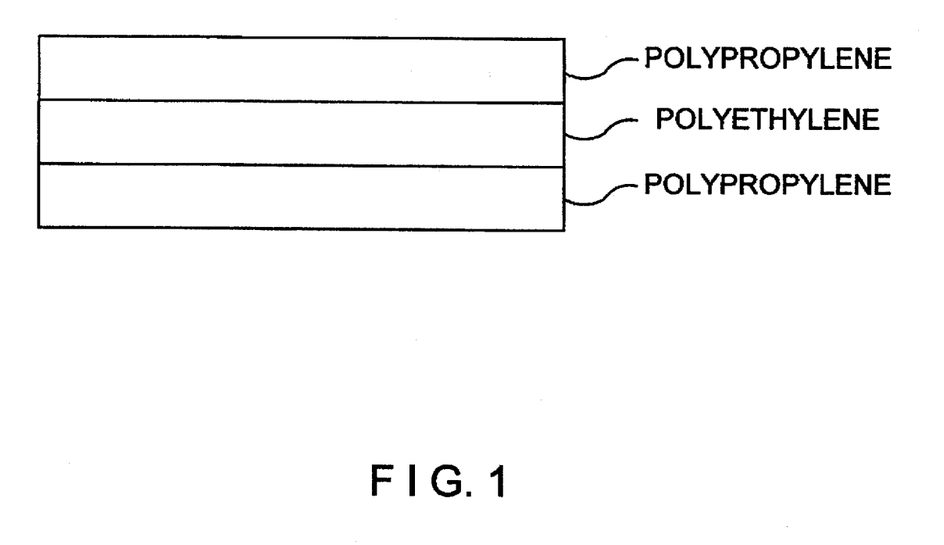
FIG. 1 shows a representative structure of the porous multi-layer film of the invention.
Figure 2:
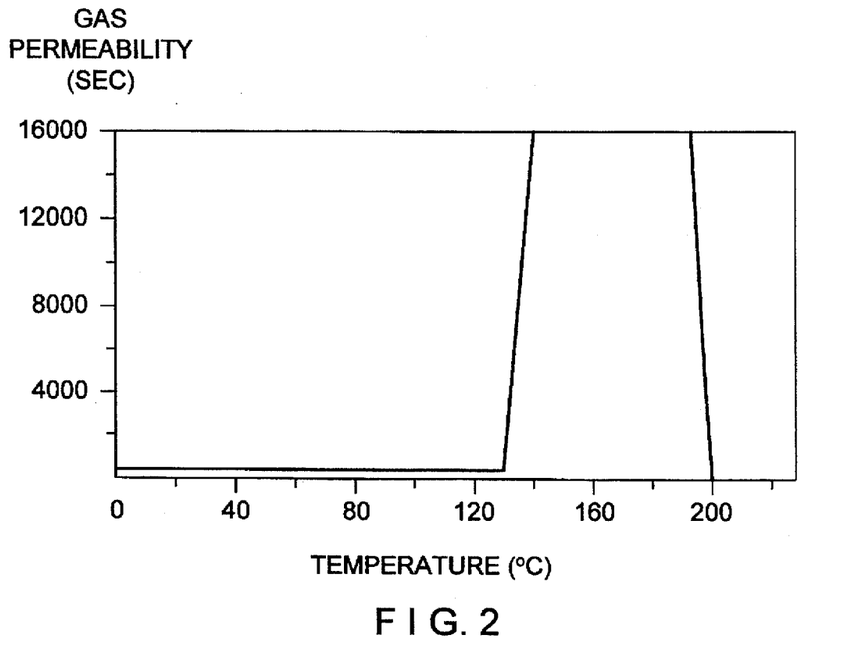
FIG. 2 shows a shutdown temperature and thermal durability of a porous multi-layer film of Example 1.

The obtained porous multi-layer film was measured in its thickness, pore volume, maximum pore size, pore specific surface, gas permeability, tensile strength, tensile modulus, shutdown (SD) temperature, thermal durability, peeling strength, and curling height. The results are set forth in Table 1. The porous multi-layer film had almost no curling and no pinholes. The shutdown (pore closing) behavior of the film is shown in FIG. 2, wherein the axis of ordinates is for the gas permeability (sec./100 cc) and the axis of abscissas is for the temperature (°C.).

The pore volume, maximum pore size and pore specific surface were measured by a mercury porosimeter (available from Yuasa Ionic Co., Ltd.), and the gas permeability (in terms of Gurley number) was determined by the method of JIS P8117 (corresponding to ASTM D-726). The tensile strength and tensile modulus were measured by the method of ASTM D-822. The peel strength was determined at 25° C., 65% RH using a strip of 15 mm wide which was in part peeled on the interface at which the peel strength was to be determined and drawing under T-peeling the strip of 75 mm at a rate of 500 mm/min.

The shutdown behavior, shutdown temperature (shutdown starting temperature), and thermal durability were determined by the steps of heating the film specimen wholly fixed to a holder of 60 mm diameter inside an oven with circulating air heated to the preset temperature for one minute, taking out the heated film specimen to cool it still under the fixed condition to room temperature, and measuring the gas permeability (defined in JIS P8117 corresponding to ASTM D-822).

The curling height was measured by placing a strip of 20 mm×100 mm of the film on a metal plate, treating the placed film by means of a static eliminator brush two or three times, allowing the film to stand for 5 minutes, and measuring an average (D) of heights of beth ends along the longitudinal side, as illustrated in FIG. 6.

EXAMPLE 2

Polypropylene (number average molecular weight: 70,000, weight average molecular weight: 480,000, melt index: 3, Ube Polypro F103EA, available from Ube Industries Ltd.) was melt-extruded at 200° C. using a T-die (discharge width: 1,000 mm, discharge lip opening: 4 mm). The discharged film was sent to a cooling roll kept to 90° C. and cooled by applying a cooled air (25° C.). The cooled film was then collected at a rate of 32 m/min. and a draft ratio of 366. The obtained polypropylene film (unstretched) had a thickness of 12 µm, a birefringence of $14.7 \times 10^{-3}$, and an elastic recovery of 88.2% at 100% elongation of the film after heat treatment at 150° C. for 60 minutes.

Independently, high density polyethylene (density: 0.964 g/cm$^2$, melt index: 0.3, Hizex 5202B, available from Mitsui Petrochemical Co., Ltd.) was melt-extruded at 177° C. using a T-die (discharge width: 1,000 mm, discharge lip opening: 2 mm). The discharged film was sent to a cooling roll cooled to 120° C. and cooled by applying a cooled air (25° C.). The cooled film was then collected at a rate of 35 m/min. and a draft ratio of 380. The obtained polyethylene film (unstretched) had a thickness of 12 μm, a birefringence of $35.3 \times 10^{-3}$, and an elastic recovery of 38.9% at 50% elongation of the film.

A laminated three layer film comprising two polypropylene layers and one intervening polyethylene layer was prepared in the following manner using the above obtained unstretched polypropylene film and unstretched polyethylene film.

Two sheets of the unstretched polypropylene films and one sheet of the unstretched polyethylene film were wound out from respective feed roll stands at a rate of 5.4 m/min. The unstretched films were passed through heating rolls to combine the films at 130° C. and 1.8 kg/cm (linear pressure), and then collected by a cooling roll (cooled to 50° C.) at the same rate. The tensions applied for winding out the unstretched films were 3 kg for the polypropylene films and 0.9 kg for the polyethylene film. The resulting laminated film had a thickness of 34 μm and a peeling strength of 7 g/15 mm.

The laminated three-layer film was passed through an oven with circulating heated air (heated to 125° C.) for a period of 113 seconds at 5% stretching. The heat-treated film was stretched by means of a set of nip rolls kept at 35° C. to produce 20% stretching. The distance between the nip rolls was 350 mm, and the feed roll gave a feeding rate of 1.6 m/min. The film was subsequently supplied into an oven with circulating a heated air (heated to 110° C.) for stretching the heated film to give total 115% stretching utilizing difference of circumferential rate of the employed rolls. The twice stretched film was then heat-fixed on a heated roll at 125° C. for 25 seconds to attain 16.7% relaxation. In this manner, a continuous porous multi-layer film was obtained.

Figure 3:
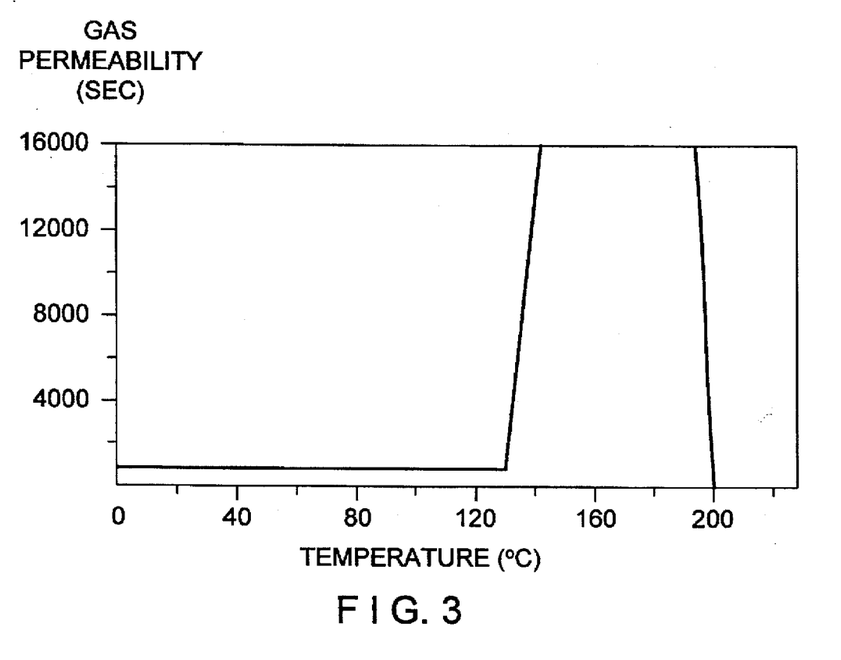
FIG. 3 shows a shutdown temperature and thermal durability of a porous multi-layer film of Example 2.

The obtained porous multi-layer film was measured in its thickness, pore volume, maximum pore size, pore specific surface, gas permeability, tensile strength, tensile modulus, shutdown (SD) temperature, thermal durability, peeling strength, and curling height, by the method as described in Example 1. The results are set forth in Table 1. The porous multi-layer film had almost no curling and no pinholes. The shutdown (pore closing) behavior of the film is shown in FIG. 3, wherein the axis of ordinates is for the gas permeability (sec./100 cc) and the axis of abscissas is for the temperature (°C.).

Comparison Example 1

High density polyethylene (density: 0.964 g/cm², melt index: 0.3, Hizex 5202B, available from Mitsui Petrochemical Co., Ltd.) was melt-extruded at 163° C. using a T-die (discharge width: 1,000 mm, discharge lip opening: 4 mm). The discharged film was sent to a cooling roll at 125° C. and cooled by applying a cooled air (25° C.). The cooled film was then collected at a rate of 10 m/min. and a draft ratio of 120. The obtained unstretched polyethylene film had a thickness of 38 μm, a birefringence of $31.6 \times 10^{-3}$, and an elastic recovery of 41.3% at 50% elongation of the film.

The unstretched polyethylene film was passed through an oven with circulating heated air (heated to 125° C.) for a period of 150 seconds at 10% stretching. Thus heat-treated film was stretched by means of a set of nip rolls kept at 35° C. to produce 50% stretching. The distance between the nip rolls was 350 mm, and the feed roll gave a feeding rate of 1.2 m/min. The film was subsequently supplied into an oven with circulating heated air (heated to 125° C.) for stretching the heated film to give 110% stretching utilizing difference of circumferential rate of the employed rolls. The twice stretched film was then heat-fixed on a roll at 108° C. for 28 seconds to attain 16.7% relaxation. In this manner, a continuous porous single ply polyethylene film was obtained.

Figure 4:
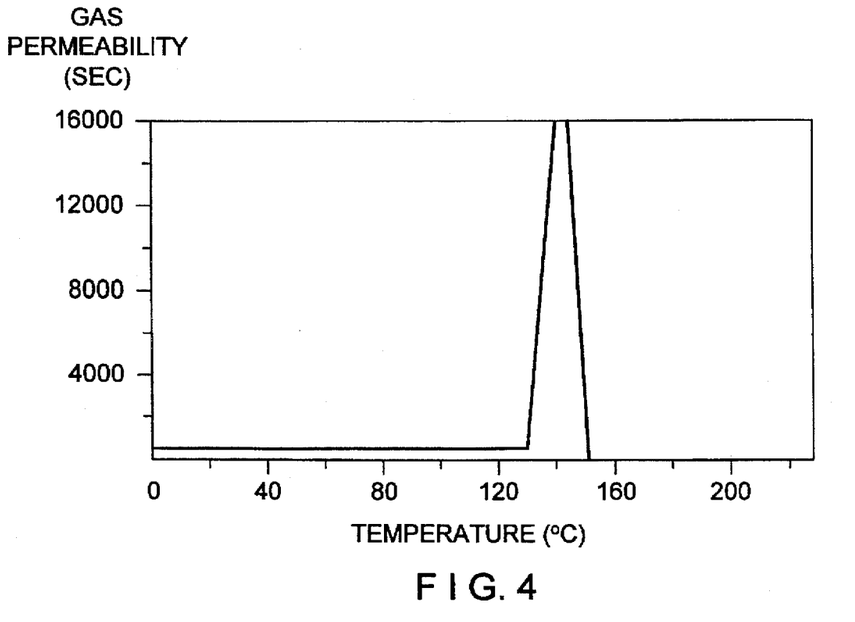
FIG. 4 shows a shutdown temperature and thermal durability of a porous single ply polyethylene film of Comparison Example 1.

The obtained porous single ply polyethylene film was measured in its thickness, pore volume, maximum pore size, pore specific surface, gas permeability, tensile strength, tensile modulus, shutdown (SD) temperature, thermal durability, peeling strength, and curling height, by the method as described in Example 1. The results are set forth in Table 1. The porous multi-layer film had almost no curling and no pinholes. The shutdown (pore closing) behavior of the film is shown in FIG. 4, wherein the axis of ordinates is for the gas permeability (sec./100 cc) and the axis of abscissas is for the temperature (°C.).

Comparison Example 2

Polypropylene (number average molecular weight: 70,000, weight average molecular weight: 480,000, melt index: 3, Ube Polypro F103EA, available from Ube Industries Ltd.) was melt-extruded at 190° C. using a T-die (discharge width: 1,000 mm, discharge lip opening: 4 mm). The discharged film was sent to a cooling roll at 90° C. and cooled by applying a cooled air (25° C.). The cooled film was then recovered at a rate of 40 m/min. and a draft ratio of 156. The obtained unstretched polypropylene film had a thickness of 29 μm, a birefringence of $13.2 \times 10^{-3}$, and an elastic recovery of 92% at 100% elongation of the film after heat treatment at 150° C. for 60 minutes.

The unstretched polypropylene film was passed through an oven with circulating heated air (heated to 150° C.) for a period of 113 seconds at 10% stretching. Thus heat-treated film was stretched by means of a set of nip rolls kept at 130° C. to produce 20% stretching. The distance between the nip rolls was 350 mm, and the feed roll gave a feeding rate of 1.6 m/min. The film was subsequently supplied into an oven with circulating heated air (heated to 130° C.) for stretching the heated film to give 115% stretching utilizing difference of circumferential rate of the employed rolls. The twice stretched film was then heat-fixed on a heated roll at 145° C. for 25 seconds to attain 16.7% relaxation. In this manner, a continuous porous single ply polypropylene film was obtained.

Figure 5:
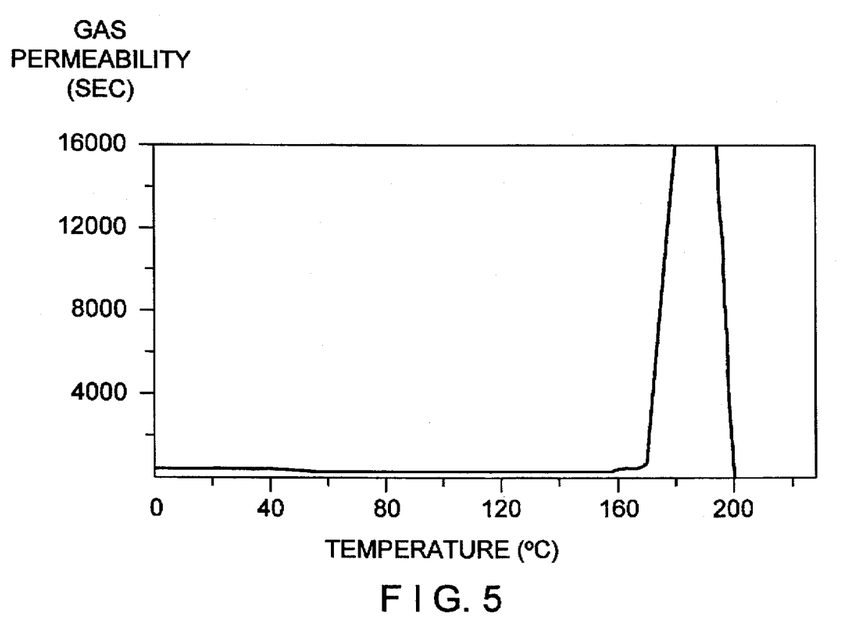
FIG. 5 shows a shutdown temperature and thermal durability of a porous single ply polypropylene film of Comparison Example 2.

The obtained porous single ply polypropylene film was measured in its thickness, pore volume, maximum pore size, pore specific surface, gas permeability, tensile strength, tensile modulus, shutdown (SD) temperature, thermal durability, peeling strength, and curling height, by the method as described in Example 1. The results are set forth in Table 1. The porous multi-layer film had almost no curling and no pinholes. The shutdown (pore closing) behavior of the film is shown in FIG. 5, wherein the axis of ordinates is for the gas permeability (sec./100 cc) and the axis of abscissas is for the temperature (° C.).

Comparison Example 3

An unstretched polyethylene film of 11 μm thick was prepared in the same manner as in Comparison Example 1 except for changing the discharge lip opening to 2 mm and the collecting rate to 12 m/min. The unstretched polyethylene film was stretched in the same manner as in Comparison Example 1 to prepare a porous polyethylene film having 8 μm thick, a pore volume of 49%, and a maximum pore size of 0.123 μm.

An unstretched polypropylene film of 21 μm thick was prepared in the same manner as that in Comparison Example 2. The unstretched polypropylene film was stretched in the same manner as in Comparison Example 2 to prepare a porous polypropylene film having 18 μm thick, a pore volume of 52%, and a maximum pore size of 0.190 μm.

The stretched polyethylene film and stretched polypropylene film were combined at 134° C. using a roll press to prepare a porous laminated two layer film.

The obtained porous two layer film was measured in its thickness, etc., by the method as described in Example 1. The results are set forth in Table 1.

Comparison Example 4

Two sheets of the stretched polypropylene film prepared in Comparison Example 3 and one sheet of the stretched polyethylene film prepared in Comparison Example 3 were overlaid in the order of polypropylene film-polyethylene film-polypropylene film and were combined at 134° C. using a roll press to prepare a porous laminated three layer film.

The obtained porous three layer filmy as measured in its thickness, etc., by the method as described in Example 1. The results are set forth in Table 1.

TABLE 1

|  | Example | | Comparison Example | | | |
|---|---|---|---|---|---|---|
|  | 1 | 2 | 1 | 2 | 3 | 4 |
| Film thickness (μm) | 31 | 31 | 30 | 25 | 25 | 43 |
| Pore volume (%) | 44.6 | 44.9 | 45.6 | 44.6 | 49.5 | 49.8 |
| Max. pore size (μm) | .1471 | .1784 | .1776 | .1568 | .1710 | .1730 |
| Pore specific surface area (m$^2$/g) | 54 | 78 | 54 | 67 | 64 | 62 |
| Gas permeability (sec./100 cc) | 540 | 750 | 517 | 333 | 1000 | 1900 |
| Tensile strength (kg/cm$^2$) MD | 1000 | 1410 | 1630 | 1330 | 1770 | 1600 |
| TD | 130 | 100 | 88 | 170 | 100 | 120 |
| Tensile modulus (kg/cm$^2$) TD | 8600 | 11900 | 4600 | 5900 | 4300 | 5100 |
| SD temperature (°C.) | 135 | 140 | 135 | 170 | 135 | 135 |
| Thermal stability (°C.) | 190 | 190 | 140 | 190 | 190 | 190 |
| Peel strength (g/15 mm) | 24.9 | 10.3 | — | — | 0.6 | 0.5 |
| Curling height (mm) | 0.5 | 1.8 | 0.5 | 0.8 | 15.5 | 2.3 |

We claim:

1. A porous multi-layer film comprising two polypropylene layers with a polyethylene layer sandwiched therebetween, said three layers being combined to form a united structure with a peel strength of at least 3 g/15 mm, which has a pore volume in the range of 30 to 80%, a maximum pore size in the range of 0.02 to 2 μm, a gas permeability in the range of 150 to 1,500 in terms of Gurley Number, a shutdown temperature in the range of 135° to 140° C., and a thermal durability to maintain the shutdown condition up to at least 180° C.

2. A separator film to separate a positive electrode from a negative electrode in a nonaqueous electric battery, which comprises the porous multi-layer film defined in claim 1.

3. The separator film to separate a positive electrode from a negative electrode in a lithium electric battery, which comprises the porous multi-layer film defined in claim 1.

4. The porous multi-layer film of claim 1, in which each layer has a thickness in the range of 5 to 20 μm.

5. A separator film to separate a positive electrode from a negative electrode in a nonaqueous electric battery, which comprises the porous multi-layer film defined in claim 4.

6. A separator film to separate a positive electrode from a negative electrode in a lithium electric battery, which comprises the porous multi-layer film defined in claim 4.

7. The porous multi-layer film of claim 1, which has a gas permeability in the range of 300 to 800 in terms of Gurley Number.

8. A separator film to separate a positive electrode from a negative electrode in a nonaqueous electric battery, which comprises the porous multi-layer film defined in claim 7.

9. A separator film to separate a positive electrode from a negative electrode in a lithium electric battery, which comprises the porous multi-layer film defined in claim 7.

10. The porous multi-layer film of claim 1, which is prepared by stretching a laminate of the polypropylene and polyethylene layers, and which has a united structure with a peel strength in the range of 3 to 60 g/15 mm.

11. A separator film to separate a positive electrode from a negative electrode in a nonaqueous electric battery, which comprises the porous multi-layer film defined in claim 10.

12. A separator film to separate a positive electrode from a negative electrode in a lithium electric battery, which comprises the porous multi-layer film defined in claim 10.

13. The porous multi-layer film of claim 1, which contains no fillers.

14. A separator film to separate a positive electrode from a negative electrode in a nonaqueous electric battery, which comprises the porous multi-layer film defined in claim 13.

15. A separator film to separate a positive electrode from a negative electrode in a lithium electric battery, which comprises the porous multi-layer film defined in claim 13.

16. The porous multi-layer film of claim 1, whose curling height is less than 5 mm, said curling height being measured by placing a strip of 20 mm×100 mm of the film on a metal plate and measuring an average of heights of both ends along the longitudinal side.

17. A separator film to separate a positive electrode from a negative electrode in a nonaqueous electric battery, which comprises the porous multi-layer film defined in claim 16.

18. A separator film to separate a positive electrode from a negative electrode in a lithium electric battery, which comprises the porous multi-layer film defined in claim 16.

* * * * *